United States Patent [19]
Paul

[11] Patent Number: 4,843,813
[45] Date of Patent: Jul. 4, 1989

[54] COMPACT TURBOCOMPRESSOR UNIT

[76] Inventor: Marius A. Paul, 1100 E. Orangethorpe Ave., Ste. 140, Anaheim, Calif. 92801

[21] Appl. No.: 127,804

[22] Filed: Dec. 2, 1987

Related U.S. Application Data

[63] Continuation-in-part of Ser. No. 928,733, Nov. 7, 1986, abandoned, which is a continuation of Ser. No. 764,424, Aug. 9, 1985, abandoned.

[51] Int. Cl.⁴ ............................................. F02C 3/08
[52] U.S. Cl. ................................. 60/391.62; 417/407
[58] Field of Search .............. 60/39.161, 39.162, 612; 415/64, 69, 199.1, 199.2; 417/407

[56] References Cited

U.S. PATENT DOCUMENTS 2,575,682  11/1951  Price ................................ 60/39.161
3,465,518   9/1969  Erwin ............................... 60/39.161

FOREIGN PATENT DOCUMENTS 874897  8/1961  United Kingdom ............. 60/39.161

Primary Examiner—Louis J. Casaregola
Attorney, Agent, or Firm—Bielen and Peterson

[57] ABSTRACT

A compact double-stage turbocompressor unit having a compressor section with two-stage, radially aligned rotors that are counter rotated and a turbine section with two-stage, radially aligned rotors that are counter rotated, the rotors of the low pressure compressor and turbine sections being interconnected and the rotors of the high pressure compressor and turbine sections being interconnected.

4 Claims, 1 Drawing Sheet

COMPACT TURBOCOMPRESSOR UNIT

BACKGROUND OF THE INVENTION

This application is a continuation-in-part of my earlier applications entitled, PROCESS OF INTENSIFICATION OF THE THERMOENERGETICAL CYCLE AND AIR JET PROPULSION ENGINES, Ser. No. 06/928,733, Filed: Nov. 7, 1986 (abandoned) which is a continuation of Ser. No. 06/764,424, Filed: Aug. 9, 1985 (abandoned).

This invention relates to a compact multistage turbine engine design that includes a balanced turbine and compressor. The engine design relates to a turbocompressor of the general type disclosed in the prior art patent of Pavlecka et al, U.S. Pat. No. 2,414,551 in which a multistage compressor is connected to a multistage turbine in a configuration that minimizes the overall length of the combination unit.

Unlike the Pavlecka unit which combines a double stage radial compressor with a multistage axial turbine, applicant couples a compound radial compressor with a matched compound radial turbine. The compound radial compressor accomplishes in a single compound design the effect of the two separate radial stages of Pavlecka. Similarly, the matched compound radial turbine accomplishes the expansion in a single compound design replacing the multiple axial stages of Pavlecka. Furthermore, in applicant design the low pressure inner stage of the compressor is coupled to the low pressure inner stage of the turbine and the high pressure outer stage of the compressor is coupled to the high pressure outer stage of the turbine. The coupled subunits are counter rotated to quadruple the dynamic effect.

Other features will be apparent from a consideration of the summary of the invention and the detailed description of the preferred embodiment.

SUMMARY OF THE INVENTION

This invention relates to a compact turbine and compressor arrangement that combines a compound, two-stage radial compressor with a compound two-stage radial turbine. The turbine and compressor arrangement, or turbocompressor, is symmetrical in configuration and compact in design with coupled low pressure and high pressure stages of the compressor and turbine being counter rotated to enhance the power output of the unit. The balanced turbocompressor is configured for coupling with an annular combustor of conventional design, which is not a part of this invention.

The turbocompressor has a common axis with concentric axial rotation of the oppositely rotating rotors in a stationary housing. The overall length of the unit is substantially less than equivalently powered units.

The arrangement could be used for power take-off from either or both rotors, or, the arrangement can be used with a suitable nozzle for a reaction jet. As presently arranged, power take off work is available at the axel of the connected low pressure components.

BRIEF DESCRIPTION OF THE PREFERRED EMBODIMENTS

Figure 1:
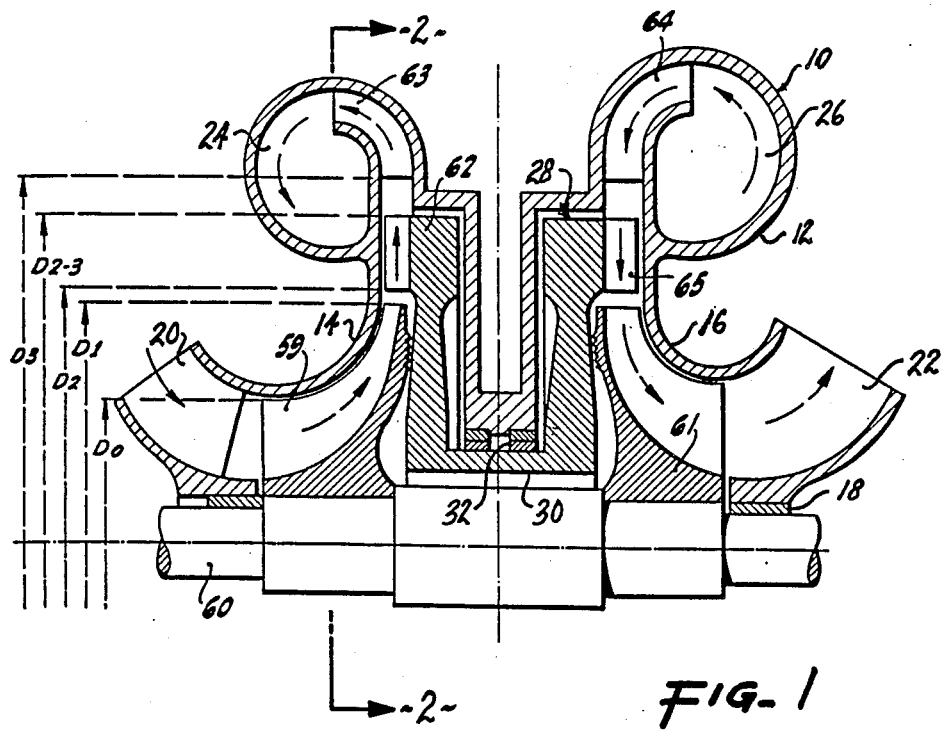
FIG. 1 is a one-half axial, cross sectional view of the turbocompressor unit of this invention.
Figure 2:
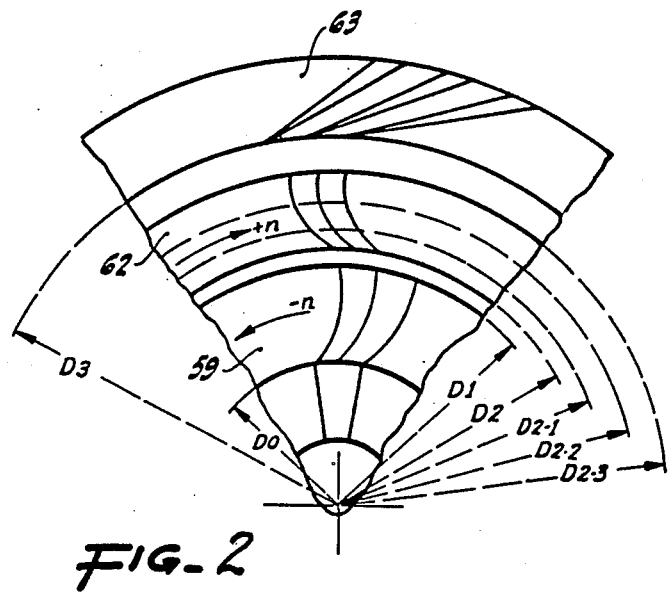
FIG. 2 is a cross sectional view partially fragmented of the turbocompressor of FIG. 1 taken on the lines 2—2 in FIG. 1.

The turbocompressor unit 10 with counter-rotative radial rotors according to this invention, shown in FIGS. 1 and 2, is formed with a unitary housing 12 that encompasses the compressor section 14 and the turbine section 16 of the turbocompressor unit 10. The housing is mounted on a central axel 60 on bearings 18 and has a symmetrical horn configuration with an air intake 20 and an exhaust gas outflow 22.

The housing also includes a compressed air receiving manifold 24 and a combustion gas manifold 26 between which a suitable combustion chamber component (not shown) can be installed to receive compressed air, inject and ignite fuel and eject combusted gases. The combustion chamber unit can be of conventional variable design, sized and constructed according to the type of fuel utilized.

Within the housing is a counter rotating rotor assembly 28. A first central radial compressor rotor 59 is mounted on an enlarged segment of the central axel 60 on which is also assembled the first rotor 61 of the central radial turbine such that the first rotors rotate together with the axel. The rotor 59 has an inlet diameter $D_o$ and an outlet diameter $D_1$ to provide a first stage of radial compression. The compressed air from the central rotor 59 is led to a peripherally arranged counter-rotative second rotor 62, radially concentric with the first rotor. The second rotor 62 in its role as a difusser is provided with blade curvature from diameter $D_2$ to $D_{2-1}$, and as a connecting zone with continued blade curvature from diameter $D_{2-2}$ to $D_{2-3}$. The compressed air which exits the counter-rotative peripheral rotor 62, enters the air diffuser of the housing before entering the receiving manifold 24.

High pressure burned gases enter the rotary turbine component of the unit through the peripheral guide blades of the stator 64 which are optimumly arranged to direct the flow to the blades of the high pressure second rotor 65 of the dual, counter rotating turbine rotors 65 and 61. The blades of the second rotor 65 are manufactured similar to the blades of the compressor 62 but with inverted functions. The burned gases which leave the blades of the rotor are led to the central turbine rotor 61 from where they are exhausted through the outflow 22 of the housing. Compression rotor 62 and turbine rotor 65 are connected together on unitary sleeve shaft 30 which is rotatable on a housing bearing 32.

The counter-rotative rotary motion of the two coupled concentric, turbocompressor components assures two compression stages within a single, unitary, turbocompressor design of dimensional size comparable to a turbocompressor with a single stage. Because the relative speed between the two rotors is double, the thermodynamic target for the counter-rotative assembly increases four times with coupled rotors 62 and 65 rotatably opposite to the rotation of coupled rotors 59 and 61, respectively.

While in the foregoing embodiments of the present invention have been set forth in considerable detail for the purposes of making a complete disclosure of the invention, it may be apparent to those of skill in the art that numerous chambers may be made in such detail without departing from the spirit and principles of the invention.

What is claimed is:

1. A compact turbocompressor unit comprising:

a two-stage radially aligned compressor section and a two-stage radially aligned turbine section, the compressor section and the turbine section having a common axis of rotation and a common housing with an intake end and an exhaust end, and with an annular compressed air manifold in the compressor section and an annular combustion gas manifold in the compressor section;

wherein the compressor section has an air intake at the intake end and a first low pressure compressor rotor axially arranged with the intake to receive air axially from the intake and constructed to eject air radially from the first compressor rotor; a second high pressure compressor rotor arranged concentrically around the first rotor to receive air radially from the first compressor rotor and constructed to eject air radially from the second compressor rotor, a compressor stator arranged concentrically around the second compressor rotor to receive air radially from the second compressor rotor and constructed to direct air to the annular compressed air manifold;

wherein the turbine section has an exhaust gas outflow at the exhaust end of the housing and a first low pressure turbine rotor axially arranged with the outflow to eject exhaust gases axially to the outflow and constructed to receive gases radially into the first turbine rotor and a second high pressure turbine rotor arranged concentrically around the first turbine rotor to eject gases radially into the first turbine rotor and constructed to receive combustion gases radially into the second turbine rotor, a turbine stator arranged radially concentric with the second turbine rotor to direct combustion gases from the annular combustion gas manifold radially into the second turbine rotor, and wherein the first compressor rotor is directly connected to the first turbine rotor for rotation in unison, the second compressor rotor is directly connected to the second turbine rotor for rotation in unison and the first compressor rotor and first turbine rotor rotate opposite the second turbine rotor and the second compressor rotor.

2. The compact turbocompressor unit of claim 1 wherein the compressor stator is constructed to direct compressed air from the second compressor toward the intake end of the housing wherein the annular compressed air manifold is proximate to and concentric with the air intake for minimization of the axial length of the turbocompressor unit.

3. The compact turbocompressor unit of claim 1 wherein the turbine stator is constructed to direct combustion gases in the annular combustion gas manifold away from the exhaust end of the housing wherein the annular combustion gas manifold is proximate to and concentric with the exhaust gas outflow for minimization of the axial length of the turbocompressor.

4. The compact turbocompressor unit of claim 2 wherein the turbine stator is constructed to direct combustion gases in the combustion gas manifold away form the exhaust end of the housing wherein the compressor section is substantially the same configuration as the rotor section and the axial length of the turbocompressor unit is minimized.

* * * * *